(12) United States Patent
Enoch

(10) Patent No.: US 11,192,600 B2
(45) Date of Patent: Dec. 7, 2021

(54) ROBOT LEG

(71) Applicant: Robotical Ltd., Edinburgh (GB)

(72) Inventor: Alexander Michael Enoch, Edinburgh (GB)

(73) Assignee: Robotical Ltd., Edinburgh (GB)

( * ) Notice: Subject to any disclaimer, the term of this patent is extended or adjusted under 35 U.S.C. 154(b) by 642 days.

(21) Appl. No.: 15/577,200

(22) PCT Filed: May 25, 2016

(86) PCT No.: PCT/GB2016/051519
§ 371 (c)(1),
(2) Date: Nov. 27, 2017

(87) PCT Pub. No.: WO2016/189309
PCT Pub. Date: Dec. 1, 2016

(65) Prior Publication Data
US 2018/0170466 A1    Jun. 21, 2018

(30) Foreign Application Priority Data
May 25, 2015    (GB) ........................................ 1508902

(51) Int. Cl.
*B62D 57/032*    (2006.01)
*B25J 13/00*    (2006.01)
(52) U.S. Cl.
CPC ............. *B62D 57/032* (2013.01); *B25J 13/00* (2013.01)
(58) Field of Classification Search
CPC ................................ B62D 57/032; B25J 13/00
See application file for complete search history.

(56) References Cited

U.S. PATENT DOCUMENTS

| 6,998,809 B2 * | 2/2006 | Iribe | ...................... B25J 9/1633 |
| | | | 318/568.12 |
| 7,606,634 B2 * | 10/2009 | Takenaka | ............. B62D 57/032 |
| | | | 180/65.1 |

(Continued)

FOREIGN PATENT DOCUMENTS

| CN | 101229826 A | 7/2008 |
| CN | 103496411 A | 1/2014 |
| FR | 2918304 A1 | 1/2009 |

OTHER PUBLICATIONS

The International Bureau of WIPO, International Preliminary Report on Patentability (Chapter I) for International Application No. PCT/GB2016/051519, dated Dec. 7, 2017, 12 pages, Switzerland.

(Continued)

*Primary Examiner* — Jacob D Knutson
(74) *Attorney, Agent, or Firm* — Alston & Bird LLP

(57) ABSTRACT

A robot leg (125) comprises an upper link (101) and a lower link (111). The upper link (101) operates nominally in a first vertical plane, for example the sagittal plane, while the lower link (111) operates nominally in a second vertical plane, nominally orthogonal to the first plane, for example the coronal plane. The leg (125) may also comprise a twist joint in the knee, and may comprise four-bar linkages (102*a-b*, 103*a-d*, 112*a-b*, 113*a-d*), such that the foot (106) stays parallel to the hip (102*a*). The leg (125) may be used in a robot to allow the construction of a robot capable of three dimensional movement, using a small number of actuators per leg.

17 Claims, 15 Drawing Sheets

(56) References Cited

U.S. PATENT DOCUMENTS

| | | | |
|---|---|---|---|
| 9,427,868 B1* | 8/2016 | Kim .................. | B25J 9/1605 |
| 2002/0116091 A1* | 8/2002 | Yamamoto ............ | B25J 9/1674 |
| | | | 700/261 |
| 2009/0294187 A1* | 12/2009 | Lee .................... | B62D 57/032 |
| | | | 180/8.6 |
| 2012/0259461 A1 | 10/2012 | Yang | |
| 2015/0122559 A1 | 5/2015 | Nagatsuka | |

OTHER PUBLICATIONS

Intellectual Property Office, Search Report for Application No. GB1508902.2, dated Nov. 5, 2015, 2 pages, United Kingdom.

Chevallereau, Christine, et al., "Asymptotically Stable Walking of a Five-Link Underactuated 3D Bipedal Robot", IEEE Transactions on Robotics 25, submitted on Jan. 8, 2008, revised on Jun. 18, 2008, 16 pages, retrieved from Cornell University Library at https://arxiv.org/pdf/1002.3258.pdf on Nov. 27, 2017.

Heaston, Jeremy, et al., "STriDER: Self-Excited Tripedal Dynamic Experimental Robot", 2007 IEEE International Conference on Robotics and Automation, Apr. 10-14, 2007, pp. 2776-2777, Roma, Italy, retrieved from http://www.romela.org/wp-content/uploads/2015/05/STriDER-Self-Excited-Tripedal-Dynamic-Experimental-Robot.pdf on Nov. 27, 2017.

International Searching Authority, International Search Report and Written Opinion for International Application No. PCT/GB2016/051519, dated Aug. 17, 2016, 16 pages, European Patent Office, Netherlands.

* cited by examiner

```
┌─────────────────────────────────────────────┐
│   Providing a legged robot or walking machine │
│                  (1501)                      │
└─────────────────────────────────────────────┘
                     ⇩
┌─────────────────────────────────────────────┐
│  Actuating one or more motors of a first leg and a │
│  second leg of the legged robot or walking machine │
│                  (1502)                      │
└─────────────────────────────────────────────┘
                     ⇩
┌─────────────────────────────────────────────┐
│ Actuating the hip joint of the first leg to move the upper │
│  linkage in a first direction in the sagittal plane (or   │
│                  coronal plane)              │
│                  (1503)                      │
└─────────────────────────────────────────────┘
                     ⇩
┌─────────────────────────────────────────────┐
│ Actuating the hip joint of the second leg to move the │
│ upper linkage in a second direction in the sagittal plane │
│                 (or coronal plane)           │
│                  (1504)                      │
└─────────────────────────────────────────────┘
                     ⇩
┌─────────────────────────────────────────────┐
│ Actuating the knee joint of the first and/or second legs to │
│ move the lower linkage of the first and/or second leg in  │
│          the coronal plane (or sagittal plane)            │
│                  (1505)                      │
└─────────────────────────────────────────────┘
```

Fig. 17

ROBOT LEG

CROSS REFERENCE TO RELATED APPLICATIONS

This application is a National Stage Application, filed under 35 U.S.C. 371, of International Application No. PCT/GB2016/051519, filed May 25, 2016, which claims priority to Great Britain Application No. 1508902.2, filed May 25, 2015; the contents of both of which as are hereby incorporated by reference in their entirety.

BACKGROUND

Related Field

The present invention relates to a leg for a legged robot or walking machine and associated apparatus and methods.

Description of Related Art

Legged robots, or walking machines in general, are typically designed to produce locomotive behaviour through stepping motions rather than with wheels, tracks, or the like. Such robots typically have two, four, or six legs, although other designs have been manufactured.

Often, legged robots are created heavily based on the morphology of an animal. For example, a bipedal robot or walking machine will typically have a hip joint, a knee joint, and an ankle joint, with links aping the upper leg, lower leg, and foot of a human. Designs for quadrupeds typically mimic the morphology of four-legged animals.

To produce three dimensional motion, a typical bipedal robot will have three degrees of freedom in the hip, one in the knee, and two in the ankle. The hip will typically have joints which operate in the sagittal, coronal, and transverse planes (i.e. forward/back or flexion/extension; left/right or adduction/abduction; and twist or internal/external rotation), the knee will operate in the sagittal plane, and the ankle will operate in the sagittal and coronal planes. This is a slightly simplified model of human joint anatomy, but allows a large amount of motion. The ability to shift the weight of the robot in the coronal plane (i.e. left and right) is instrumental for producing locomotion on a biped.

However, the large number of degrees of freedom in such a design requires a large number of powered joints, complicating the design of the robot and adding a significant amount of weight. In addition to this, the power consumption of the robot may be increased if more joints have to be driven. Backlash in these degrees of freedom may also contribute to reducing the stability of the robot.

In some designs, a two degree of freedom hip, with joints that act in the sagittal and transverse planes is used along with a one degree of freedom knee (sagittal) and a two degree of freedom ankle (sagittal and coronal), however, such a design results in the leaning of pelvis, and may not be conducive to efficient or stable walking.

It is an object of at least one embodiment of the present invention to provide improved or alternative designs and/or control methods for legged robots.

BRIEF SUMMARY

According to a first aspect of the present invention there is provided a leg for a legged robot or walking machine.

The leg may comprise one or more fixing points for fixing the leg to an external body, e.g. an external body of a legged robot or walking machine.

The leg may comprise a hip joint which may be configured to provide motion of the upper link relative to the one or more fixing points. The hip joint may be arranged or configured to provide motion of the upper link about one or more axes of the hip joint.

The leg may comprise a knee joint which is configured to provide motion of the lower link relative to the upper link. The knee joint may be arranged or configured to provide motion of the lower link about one or more axes of the knee joint.

The leg may comprise an upper link and a lower link. The leg may comprise a foot. The upper link may be arranged or configured to connect the knee joint to the hip joint. The lower link may be arranged or configured to connect the knee joint to a/the foot and/or an ankle of the leg. The knee joint may be connected or attached to a proximal end of the lower link. The ankle may be connected or attached to a distal end of the lower link.

The foot may be attached or connected to the ankle. The foot may be attached or connected to the ankle by a connection arrangement. The connection arrangement may keep the foot fixed or stationary relative to the ankle. The connection arrangement may comprise at least one of a compliant joint and a spherical or universal joint.

The knee joint may be configured to provide motion around an axis orthogonal or substantially orthogonal to one or more of the hip joint axes. For example, when the knee joint is connected to the hip joint, e.g. by the upper link, at least one axis of the knee joint may be arranged to be substantially orthogonal to at least one axis of the hip joint.

The leg may comprise three or fewer actuated (i.e. non-passive) degrees of freedom.

The knee joint may be arranged to be substantially equidistant from the hip joint and from the foot and/or the ankle of the leg. The length of the upper link may be substantially equal to the length of the lower link. A ratio of the length of the lower link to the length of the upper link may be between 0.5-2.0. The ratio of the length of the lower link to the length of the upper link may be between 0.3-3.0.

The hip joint may be configured or arranged to provide rotation of the upper link in the sagittal plane, e.g. flexion/extension, about the/a axis of the hip joint, which may be arranged to be substantially perpendicular to a central or longitudinal axis of the leg or substantially perpendicular to the sagittal plane.

The hip joint may be configured or arranged to provide rotation of the upper link in the coronal plane, e.g. adduction/abduction about the/a axis of the hip joint, which may be arranged to extend in a nominal anteroposterior direction of the hip joint or be substantially perpendicular to the coronal plane.

The knee joint may be configured or arranged to provide motion of the lower link in the coronal plane. The knee joint may not provide motion in the sagittal plane.

The knee joint may be configured or arranged provide motion of the upper link in the sagittal plane.

For example, the hip joint may be configured to provide motion of the upper link in the sagittal plane (e.g. flexion/extension) and the knee joint may be configured provide motion of the lower link in the coronal plane (e.g. abduction/adduction). Alternatively, the hip joint may be configured to provide motion of the upper link in the coronal plane and the knee joint may be configured to provide motion of the lower link in the sagittal plane.

The knee joint and/or hip joint may be configured or arranged to provide motion of the upper and/or lower links in a transverse plane of the leg and/or about the/a nominally vertical or longitudinal axis of the leg (e.g. internal/external rotation).

For example, the hip joint may be configured or arranged to provide motion of the upper link in the sagittal plane and the knee joint may be configured or arranged to provide motion of the lower link in the coronal and/or transverse planes.

The leg may comprise an upper linkage. The upper linkage may be configured or arranged to maintain the knee joint and the hip joint substantially parallel to each other during movement of the leg, e.g. in use. The upper link may be part of or be comprised in the upper linkage. The upper linkage may comprise a plurality of upper links. The upper links of the upper linkage may be arranged to be substantially parallel to each other. The upper linkage may be or comprise at least one of a four-bar linkage, or other parallel or multiple bar linkage. The lower linkage may be or comprise at least one of a four-bar linkage, or other parallel or multiple bar linkage.

The leg may comprise a lower linkage. The lower linkage may be configured or arranged to maintain the knee joint, the foot and/or ankle substantially parallel to each other during movement of the leg, e.g. in use. The lower link may be part of or be comprised in the lower linkage. The lower linkage may comprise a plurality of lower links. The lower links of the lower linkage may be arranged to be substantially parallel to each other.

The upper and lower linkages may be configured or arranged to maintain the hip joint and ankle and/or foot substantially parallel to each other during movement of the leg, e.g. in use.

For example, the knee joint may be connected to the hip joint by at least part or all of the upper linkage, the hip joint may be configured or arranged to provide motion of at least part or all of the upper linkage primarily in the sagittal plane and/or the knee joint may be connected to the ankle, which may be fixed or connected to the knee joint by at least part or all of the lower linkage, the knee joint may be configured or arranged to provide motion of the ankle, foot and/or at least part or all of lower linkage primarily in the coronal and/or transverse plane. This may provide motion of the leg in two or more dimensions and/or maintain the foot substantially parallel to the hip by using, e.g. two motors for the case of the knee joint being configured or arranged to provide motion of the ankle, foot and/or at least part or all of lower linkage primarily in the coronal plane and/or three motors for the case of the knee joint being configured or arranged to provide motion of the ankle, foot and/or at least part or all of lower linkage primarily in the coronal and transverse planes.

In some examples, the hip joint may be configured to provide motion of the upper link and/or at least part or all of the upper linkage primarily in the sagittal and/or transverse planes, the knee joint may be configured to provide motion primarily of the lower link, at least part or all of lower linkage, ankle and/or foot in the coronal plane.

In some examples, the hip joint may be configured to provide motion of the upper link and/or at least part or all of upper linkage primarily in the coronal and/or transverse planes, the knee joint may be configured to provide motion of the lower link, at least part or all of the lower linkage, the ankle and/or foot primarily in the sagittal plane.

The term motor is used in this specification to refer to any type of actuator, for example electric motor, hydraulic actuator, pneumatic actuator, contractile element, and/or the like.

The leg may comprise one, two or more motors or actuators. The one, two or more motors or actuators may be arranged in or on the leg such that the one, two or more motors provide the three or fewer actuated degrees of freedom of the leg.

At least one of the motors or actuators may be arranged or configured to operate and/or cause motion of the hip joint, knee joint and/or ankle joints. For example, each of the hip joint, knee joint and/or ankle may be associated with and/or comprise a respective motor or actuator. The/each of the one, two or more motors or actuators may comprise one or more geared DC motors. The/each of the one, two or more motors or actuators may comprise one or more servo-motors.

The leg may comprise at least one servo housing. The/each of the one or more servo housings may be arranged or configured to substantially surround or enclose a servo or servo motor, for example a standard RC servo.

The servo housing may be part of, or comprised, in a servo motor. For example, the servo housing may be or comprise a casing of the servo motor. Alternatively, the servo housing may be separately provided or provideable from a servo motor.

The servo housing may comprise one or more connector points for connection of the link(s), e.g. of the/an upper and/or lower linkage to the servo housing. The one or more connector points may be configured to movably connect, e.g. pivotably or rotatably connect, the link(s) of the upper and/or lower linkage to the servo housing.

For example, when a servo motor is seated or positioned in the servo housing, the servo housing may be configured such that at least one of the one or more connector points may be provided by the output shaft of the servo motor. By configuring the housing so that at least one of the one or more connector points is provided by the servo motor, the links of the upper and/or lower linkages connected to the servo housing may be driven by the servo motor, e.g. a single servo motor. This may provide a compact arrangement of the leg and/or reduce loading on the output shaft of the servo motor.

At least one other of the one or more of the connector points may be provided directly by the servo housing. The servo housing may be configured to fix or be affixed to at least one servo, e.g. by a friction fit and/or by one or more mechanical fixings.

The servo housing may comprise at least two connector points. The at least two connector points may be arranged on the servo housing such that the at least two connector points define at least two respective axes of rotation. The at least two axes of rotation may be arranged to be non-collinear to each other. In other words, the two axes of rotation may be arranged on the servo housing to be spaced, offset and/or extend parallel to each other.

The servo housing may comprise at least two other connector points. The at least two other connector points may be arranged on the servo housing such that the two other connector points define at least two other respective axes of rotation. The at least two other axes of rotation may be arranged to be in line to each other or collinear to each other. By provide at least two other connector points, additional links of the upper and/or lower linkage may be connectable to the servo housing. This may improve or strength a rigidity of the upper and/or lower linkages.

The servo motor (or parts thereof) may be arranged or arrangeable in the servo housing so as to provide at least one of the two and the two other connector points.

The at least two connector points and/or the at least two other connector points may be or comprise connector points for connection to bars of the four bar linkage.

The one or more servo housings or servo motors may form links in upper and/or lower linkages (e.g. the one or more four bar linkages or other multiple bar linkages). At least a portion or all of at least one servo housing may be part of or comprised in the upper linkage. At least a portion or all of at least one servo housing may be part of or comprised in the lower linkage.

The/each of the one or more connector points may comprise a shaft and/or bore for movable connection, e.g. pivotal or rotatable connection, of a link of the upper and/or lower linkages to the servo housing. The/each of the one or more connector points may comprise one or more bearings and/or bushings for movable connection, e.g. pivotal or rotatable connection, of a link of the upper and/or lower linkages. The/each of the one or more connector points may comprise one or more lips, ridges, grooves or fixing elements for retaining and/or fixing a link of an upper linkage and/or a lower linkage to the servo housing.

Each of the connector points may comprise a pair of parallel sublinkage connector points. This may allow for the attachment of additional linkage parts which may operate in parallel to strengthen or improve the rigidity of an upper and/or lower linkage (e.g. a four bar linkage or other multiple bar linkage). Each pair of parallel sublinkage connector points may have collinear rotational axes.

For example, the one or more servo housings may comprise linkage connector points which comprise two pairs of parallel sublinkage connector points, providing four connector points. One pair of connector points may comprise two collinear bores or other fixtures for connection of two respective links, e.g. of an/the upper and/or lower linkages, and the second pair of connector points may comprises a bore or other fixture for connection of two other respective links, e.g. of the upper and/or lower linkages, e.g. of a leg for a legged robot or walking machine, which may be collinear with the rotational axis provided by an in-situ servo.

According to a second aspect of the present invention is a legged robot or walking machine.

The legged robot or walking machine may comprise one or more legs according to the first aspect of the present invention.

The legged robot or walking machine may be a biped robot. The biped robot may comprise two legs according to the first aspect of the present invention.

The legged robot may be a triped. The triped may comprise three legs according to the first aspect of the present invention.

The legged robot may be a quadruped. The quadruped may comprise four legs according to the first aspect of the present invention.

Alternatively, the legged robot or walking machine may comprise a single leg or more than four legs according to the first aspect of the present invention.

The legged robot or walking machine may be capable of walking, hopping, shuffling, running, trotting and/or other forms of movement or locomotion.

Each leg may comprise a knee which may be configured to provide rotation in the horizontal plane (or a transverse plane of the leg). Each leg may comprise a hip joint which may be configured to provide rotation in the horizontal plane (or a transverse plane of the leg).

The legged robot may comprise two legs, each of which may comprise three motors or actuators, and the upper and lower linkages. Each leg may comprise an/the upper linkage, at least part or all of the upper linkage may act, be movable or be arranged to be moved primarily in the sagittal plane, followed by a twist joint in the knee, which may provide rotation in the horizontal plane or transverse plane of the leg, about a nominally vertical axis or longitudinal axis of the leg, followed by a/the lower linkage, at least part or all of the lower linkage may provide motion, be moveable or arranged to be moved nominally in the coronal plane, subject to twist or rotational movement from the knee twist joint.

For example, the legged robot may comprise two legs, each of which may comprise three motors or actuators, and upper and lower linkages. In this example, each of the upper and lower linkages may comprise one or more respective four-bar linkage, or other parallel linkage configured to keep and/or maintain at least one joint of the leg parallel with another joint of the leg. The upper linkages may act or be configured to move the knee joint relative to the hip joint in the sagittal plane, and this may be followed by a twist joint in the knee which may provide rotation in the horizontal or transverse plane of the leg, followed by the lower linkages, which may act or be configured to move the ankle and/or foot relative to the knee primarily in the coronal plane, subject to twist or rotational movement from the knee joint. In this way, the feet of the robot may be maintained to be parallel with each other, while movement in three dimensions of each leg is facilitated.

The legged robot or walking machine walking may comprise two or more motors or actuators. The two or more motors may be part of or comprised in each leg of the legged motor. The two or more motors or actuators may be configured to operate or cause motion of at least part of or all of the upper and/or lower linkages and/or the hip, knee and/or ankle joints, for example as described in relation to the first aspect.

In this way, a bipedal robot with two or three dimensional movement capabilities can be created, utilising only four or six motors, respectively, between both legs.

The legged robot or walking machine may comprise a linked hip twist actuator, which is configured to provide rotation, a twist motion or a motion in a transverse or horizontal plane of the legged robot or walking machine, e.g. about a nominally vertical or longitudinal axis of the legged robot or walking machine, to the hip joints of two or more legs. In this way, rotation of two or more legs may be enabled, while allowing each leg to have as few as two motors. For example, this may enable the construction of a bipedal robot with three dimensional movement functionality, with only five motors or actuators in total in or for the legs. The linked hip twist actuator may be configured to enable rotation of at least two hip joints, e.g. the hip joint of at least one or each respective leg, in opposing directions, e.g. one of the at least two hip joints may rotate clockwise while the another one of the at least two hip joints rotates anticlockwise. The linked hip twist actuator may be configured to enable rotation of the two hip joints in the same direction or a corresponding rotation, e.g. both hip joints may rotate in the same direction, e.g. both hip joints may rotate clockwise together, or anticlockwise together.

The linked hip-twist actuator may comprise a linked hip-twist joint. The linked hip-twist joint may comprise an actuator or motor to form the linked hip-twist actuator. The actuator or motor may be configured or arranged to operate and/or cause motion of the at least two legs.

The legged robot may comprise two legs, with each leg comprising two motors or actuators. In this example, each leg may comprise an upper linkage, at least part of or all of the upper linkage may act, be moveable or be arranged to be moved primarily in the sagittal plane, followed by a lower linkage, at least part of or all of the lower linkage may provide motion, be moveable or be arranged to be moved primarily in the coronal plane. In this example, there may additionally be a linked hip twist actuator, which is configured to provide rotation to the hip joints of two or more legs.

The legged robot or walking machine may comprise one or more servo housings or servo motors, as described in relation to the first aspect, or according to the third or fourth aspects.

The legged robot or walking machine may comprise an upper body. The upper body may comprise an upper portion and/or a lower portion. The upper body may comprise one or more torso joints. The one or more torso joints may be configured to provide motion of the upper portion relative to the lower portion and/or at least on leg of the legged robot or walking machine. This may aid in the balancing of the robot. The one or more torso joints may comprise a rotational joint. The rotational joint may be configured to provide motion of at least one of the upper portion and the lower portion, for example in the sagittal and/or coronal and/or transverse planes. The one or more torso joints may comprise one or more prismatic joints, which may act along nominally horizontal or transverse axes of the legged robot or walking machine, for example in the sagittal and/or coronal planes.

For example, at least one of the one or more prismatic joints may be configured to provide motion of the upper portion relative to the lower portion and/or legs, for example along a nominally horizontal or transverse axis of the legged robot or walking machine in the sagittal and/or coronal planes. This may allow the movement of the upper portion to aid in the balancing of the robot.

According to a third aspect of the present invention is a servo housing. The servo housing may be or comprise a servo housing as described in relation to the first aspect.

The servo housing may be configured to substantially surround or enclose a servo, such as a standard RC servo. The servo housing may comprise or configured to provide at least two connector points for connection of at least two respective links, e.g. of a linkage (e.g. an upper and/or lower linkage), e.g. of a leg for a legged robot or walking machine. The at least two connector points may be arranged on the servo housing such that the two connector points define at least two respective axes of rotation. The two axes of rotation may be arranged to be non-collinear to each other.

When a servo motor is seated or positioned in the servo housing, the servo housing is configured such that at least one of the at least two connector points is provided by the output shaft of the servo.

At least one of the at least two connector points may comprise a shaft and/or bore for movable connection, such as pivotal or rotatable connection, of a respective links, e.g. of a linkage (e.g. an upper and/or lower linkage), e.g. of a leg for a legged robot or walking machine, to the servo housing.

The at least two connector points may comprise one or more lips, ridges, grooves or fixing element for retaining and/or fixing at least two respective links, e.g. of a linkage (e.g. an upper and/or lower linkage), e.g. of a leg for a legged robot or walking machine, to the servo housing.

According to a fourth aspect of the present invention is a servo motor. The servo motor may be or comprise a servo motor as described in relation to the first aspect.

The servo motor may comprise an output shaft. The servo motor may comprise one or more electric motors or other actuators. The servo motor may comprise drive electronics. The drive electronics may be configured to receive a signal requesting movement of the output shaft to a commanded position and/or to actuate the output shaft of the servo motor to rotate to the commanded position.

The servo motor may comprise one or more linkage connector points. For example, the one or more linkage points may be part of or comprised in a casing of the servo motor. At least one of the one or more of the linkage connector points may be provided by the output shaft of the servo motor. At least on other of the one or more linkage connector points may comprise one or more shafts and/or bores for movable connection, e.g. pivotal or rotatable connection, of a link of the upper and/or lower linkage. The one or more linkage connector points may comprise one or more bearings and/or bushings for movable connection, e.g. pivotal or rotatable connection, of a link of the upper and/or lower linkage.

The one or more linkage connector points may be configured to connect to or attach one or more respective links of the upper and/or lower linkages. The one or more linkage connector points may comprise one or more lips, ridges, grooves, or other fixing elements. The one or more lips, ridges, grooves, or other fixing elements may be configured to retain and/or locationally fix one or more respective links so that the one or more links define one or more respective axes.

The servo motor may comprise two or more connector points which define at least two rotational axes having a non-collinear arrangement. In other words, the at least two axes may be spaced or offset from each other. In some examples, the at least two axes may be arranged to extend substantially parallel to each other.

This configuration of the servo motor may facilitate the attachment of one or more links of the upper and/or lower linkage to the server motor, while permitting at least one link of the upper and/or lower linkage to be moved by the servo motor, thereby allowing movement of the remaining links and/or maintaining at least two links parallel to each other.

According to a fifth aspect of the present invention is a method for producing locomotion of a legged robot or walking machine, wherein the legged robot or walking machine is a legged robot or walking machine according to the second aspect.

The method may comprise providing a legged robot or walking machine.

The method may comprise actuating one or more motors of a first leg and a second leg of the legged robot or walking machine. Actuation of the one or more motors of the first and second legs may result in movement of at least part of or all of the upper and/or lower linkage of the first leg and/or in movement of at least part of or all of the upper and/or lower linkage of the second leg. Movement of at least part of or all of the upper and/or lower linkages of the first and second legs may result or cause walking of the legged robot or walking machine.

The method may comprise actuating the hip joint of the first leg, e.g. to move the at least part of or all of upper linkage in a first direction (e.g. forward direction) in the sagittal plane (or coronal plane) of the legged robot or walking machine, which may lift the first leg, e.g. from a ground, and/or lower the first leg, e.g. to a ground.

The method may comprise actuating the hip joint of the second leg to move at least part of or all of the upper linkage in a second direction (e.g. backward direction) in the sagittal plane (or coronal plane) of the legged robot or walking, e.g. while moving the first leg. The second direction may be opposed to the first direction.

Subsequent to lowering the first leg, e.g. to the ground, the method may comprise actuating the hip joint of the second leg to move at least part of or all of the upper linkage in the first direction in the sagittal plane (or coronal plane) of the legged robot or walking machine, e.g. to lift the second leg from the ground and/or lower the second leg to the ground.

Subsequent to lowering the first leg to a ground, the method may comprise actuating the hip joint of the first leg to move at least part of or all of the upper linkage in the second direction in the sagittal plane (or coronal plane) of the legged robot or walking, e.g. while moving the second leg.

The method may comprise actuating the knee joint of the first and/or second legs to move at least part of or all of the lower linkage of the first and/or second leg in the coronal plane (or sagittal plane) of the legged robot or walking machine, e.g. when the first and second legs are in contact with the ground.

Once the first leg has been lowered to the ground, the step of actuating the knee joint of the first and/or second legs may comprise actuating the knee joint of the first and second legs to move at least part of or all of the lower linkage of the first and second legs in the coronal plane (or sagittal plane) in a direction of the first leg. This may permit a weight or centre of mass of the legged robot or walking machine to be shifted from one the second leg to the first leg.

Once the second leg has been lowered to the ground, the step of actuating the knee joint of the first and/or second legs may comprise actuating the knee joint of the first and second legs to move at least part of or all of the lower linkage of the first and second legs in the coronal plane (or sagittal plane) in a direction of the second leg. This may permit the weight or centre of mass of the legged robot or walking machine to be shifted from one the first leg to the second leg.

The method may comprise lifting of one or more first legs of the robot from the ground, the forward motion of the one or more first legs, and the lowering of the one or more first legs back to the ground. The method may comprise the backward motion of one or more second legs, which stay in contact with the ground. The method may comprise switching of first and second legs between steps, for example to allow for continuous locomotion.

The method may comprise shifting the weight or Zero Moment Point of the robot to above the support polygon of one or more second feet, optionally by utilising coronal plane motion in one or more of the legs. The method may then comprise lifting of one or more first feet. The method may comprise causing the forward motion of the one or more first feet relative to the one or more second feet. The method may comprise the step of then lowering the one or more first feet to the ground. The method may comprise the step of shifting the weight or Zero Moment Point of the robot inside the support polygon provided by the first and second feet, when both are on the ground.

The method may comprise actuating at least one prismatic joint to move the upper portion of the legged robot or walking machine relative to the first and second legs and/or the lower portion of the legged robot or walking machine. The at least one prismatic joint may be configured to move the upper portion relative to the lower portion and/or first and second legs in the sagittal and/or coronal planes or a transverse plane of the legged robot or walking machine. The movement of the upper portion relative to the first and second legs and/or lower portion of the legged robot or walking machine may aid in moving the weight or centre of mass of the legged robot or walking machine from the first leg to the second leg, or vice versa. This may aid the balance and/or stability of the legged robot or walking machine during the locomotion.

According to a sixth aspect there is provided a method of assembling a legged robot or walking machine.

The method may comprise providing one or more legs according to the first aspect.

The method may comprise connecting the one or more legs to an upper body of the legged robot or walking machine to form the legged robot or walking machine.

According to a seventh aspect of the present invention there is provided a computer program, which when executed on at least one processor, causes the processor to carry out the method according to the fifth aspect.

According to an eighth aspect of the present invention, there is provided a carrier containing the computer program of the sixth aspect. The carrier may be one of an electronic signal, optical signal, radio signal or non-transitory computer readable storage medium.

According to a ninth aspect of the present invention, there are provided one or more design files which provide mechanical designs or data according to the first, second, third, or fourth aspects of the present invention. For example, the one or more design files may include mesh data representing a servo housing according to the third aspect. In another example, the design files may comprise data representing the chassis of a legged robot according to the second aspect. The design files may be configured to enable the reproduction or 3D printing of one or more parts associated with the leg of the first aspect, legged robot of the second aspect, servo housing of the third aspect, or servo motor of the fourth aspect.

According to a tenth aspect of the invention, there is provided a leg for a legged robot or walking machine, wherein the leg comprises: one or more fixing points for fixing the leg to an external body; an upper link and a lower link; a hip joint which is configured to provide motion of the upper link relative to the one or more fixing points, about one or more hip joint axes; a knee joint which is configured to provide motion of the lower link relative to the upper link, about one or more knee joint axes; and wherein the knee joint is configured to provide motion around an axis orthogonal or substantially orthogonal to one or more of the hip joint axes, and one or more of the following: the knee joint is configured to provide motion nominally in the coronal plane; the hip joint nominally provides motion in the coronal plane, does not nominally provide motion in the sagittal plane, and the knee joint nominally provides motion in the sagittal plane; and/or the leg comprises three or fewer actuated (i.e. non-passive) degrees of freedom.

It should be understood that the features defined above in accordance with any aspect of the present invention or below in relation to any specific embodiment of the invention may be utilised, either alone or in combination with any other defined feature, in any other aspect or embodiment of the invention.

BRIEF DESCRIPTION OF THE FIGURES

These and other aspects of the present invention will now be described, by way of example only, with reference to the accompanying drawings, in which:

FIG. 17 is a flowchart, which illustrates a method for producing locomotion of a legged robot.

DETAILED DESCRIPTION OF VARIOUS EMBODIMENTS

Figure 1:
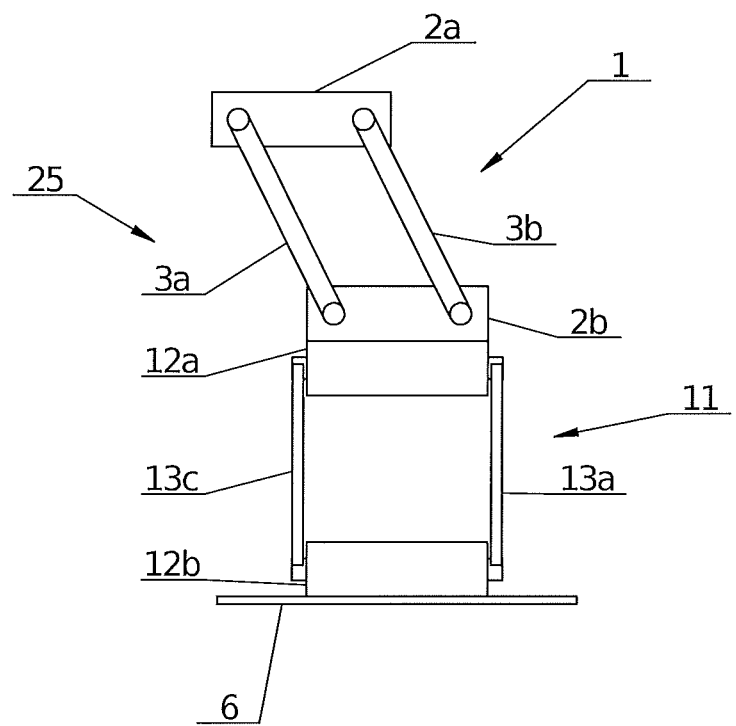
FIG. 1 shows a side view of a leg for a legged robot or walking machine.
Figure 2:
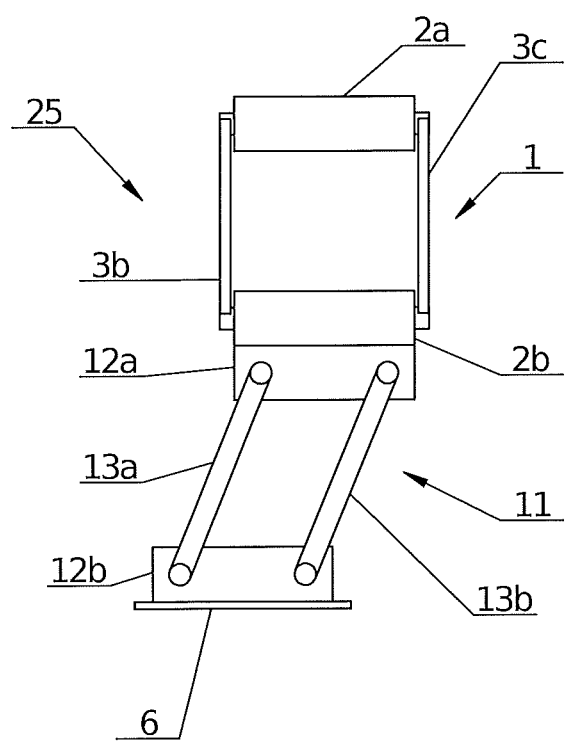
FIG. 2 shows a front view of the leg of FIG. 1.
Figure 3:
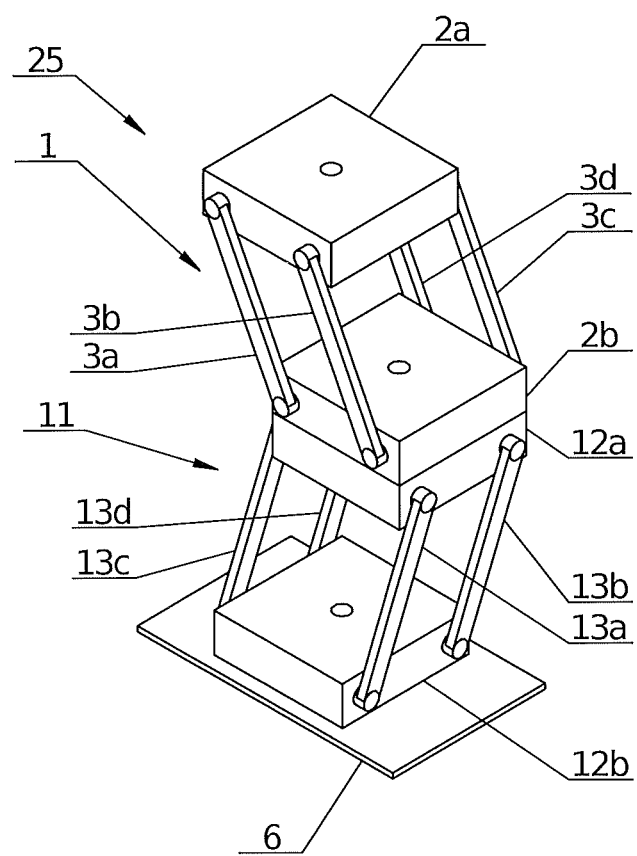
FIG. 3 shows an isometric view of leg of FIGS. 1 and 2.

FIGS. 1 to 3 show side, front and perspective views of an exemplary leg 25 for a legged robot or walking machine. The same reference numerals have been used to identify like or similar components across these three figures.

The leg 25 comprises upper linkages 1 and lower linkages 11. The upper linkages 1 includes four bars or links 3a-3d, which connect a first box 2a and to a second box 2b. The first box 2a and the second box 2b can be part of the upper linkage to form an upper pair of four-bar (or four-link) linkage. In other words, a first upper four-bar linkage is formed by the first box 2a, which is connected via a first link or bar 3a to the second box 2b, which is connected to the first box 2a by a second link or bar 3b. A second upper four-bar linkage is formed by the first box 2a, which is connected via a third bar or link 3c to the second box 2b, which is connected to the first box 2a by a fourth bar or link 3d. The first and second pair of upper four-bar linkages are arranged to be parallel to each other.

The length of each of the bars or links 3a-3d is substantially the same, which results in a substantially parallel arrangement of the first and second boxes 2a, 2b and each of the bars 3a-3d. It will be appreciated that in other examples the upper linkage 1 may include less or more than four bars. For example, the first and second boxes may be connected to each other by two links or bars, arranged on opposing sides of the first and second boxes, e.g. to be parallel to each other.

Similarly, the lower linkages 11 include four bars or links 13a-13d, which connect a third box 12a to a fourth box 12b. The third box 12a and the fourth box 12b can be part of the lower linkage to form a lower pair of four-bar (or four-link) linkage. In other words, a first lower four-bar linkage is formed by the third box 12a, which is connected via a first link or bar 13a to the fourth box 12b, which is connected to the third box 12a by a second link or bar 13b. A second lower four-bar linkage is formed by the third box 12a, which is connected via a third bar or link 13c to the fourth box 12b, which is connected to the third box 12a by a fourth bar or link 13d. The first and second pair of lower four-bar linkages are arranged to be parallel to each other.

It will be appreciated that in other examples the lower linkage 11 may include less or more than four bars or links. For example, the third and fourth boxes may be connected to each other by two links or bars, arranged on opposing sides of the first and second boxes, e.g. to be parallel to each other.

The length of each of the bars or links 13a-13d is substantially the same. A ratio of the length of the bars or links 3a-3d of the upper linkage 1 to the length of the bars or links 13a-13d of the lower linkage can be between 0.3 and 3.0. It will be appreciated that in this example, the second and third boxes 2b and 12a are secured together such that their spatial relationship is constant.

The leg 25 also comprises a foot 6, which in this example is a simple flat rectangle and attached to the fourth box 12b.

The first box 2a can be considered as part of a hip joint of the leg. The second and third boxes 2b, 12a can be considered as part of a knee joint of the leg 25. The fourth box 12b connects the lower linkage 11 to the foot 6 and may be considered as an ankle of the leg 25.

The leg 25 includes one or more fixing point (not shown) for fixing the leg 25 to an external body, e.g. a part of the legged robot. The hip joint, part of which is shown as the first box 2a, is configured to provide motion of at least parts of the upper linkage 1 (e.g. bars or links 3a to 3d and the second box 2b) relative to the one or more fixing points or a part of the legged robot and about one or more axes of the hip joint. The knee joint, which is shown as the second and third boxes 2b, 12a, is configured to provide motion of at least parts of the lower linkage 11 (e.g. bars or links 13a to 13d and the fourth box 12b) relative to the upper linkage 1 and about one or more axes of the knee joint.

As can be seen from FIGS. 1-3, at least part of the upper linkage 1 can move in a first vertical plane, while at least part of the lower linkage 11 can move in a second vertical plane, which is nominally orthogonal to the first vertical plane. In other words, at least one axis of the knee joint is arranged to be substantially orthogonal to at least one axis of the hip joint.

In this example, the leg 25 includes two degrees of freedom and by utilising two actuators (not shown in FIGS. 1 to 3) can be moved in the coronal and sagittal planes of the leg 25. For example, one actuator may be included in the hip joint and another actuator may be included in the knee joint to cause the movement of at least parts of the upper and lower linkages 1, 11, as described above. In use, the actuators can be connected or coupled to at least one link 3a, 13a of each the upper and lower linkages 1, 11 to move or rotate the link 3a, 13a of each of the upper and lower linkages 1, 11. This in turn can cause movement of the remaining links 3b-3d, 13b-13d and/or the second and fourth boxes 2b, 12b of the upper and lower linkages 1, 11. It will be appreciated that at least one or each of the actuators may include a mechanical actuator to move or rotate the link of the upper linkages 1 and the lower linkages 11. In some examples, the links 3a, 13a may be driven through a series elastic and/or variable compliance mechanism. The arrangement of one or more actuators in an exemplary leg of a legged robot or walking machine will be described below.

If the leg is based in a global coordinate frame centred in the first box 2a and defined by having a z-axis that points up (e.g. extends along a longitudinal axis of the leg 25), an x-axis that points in the direction of movement of at least part of the upper linkage 1, and a y-axis defined by the right-hand rule (e.g. perpendicular to the x- and z-axes), whereby the rotation angle of at least part of the upper linkages 1 is denoted as θ, and the rotation angle of at least part of the lower linkages 11 is denoted as ϕ, the forward kinematics of the leg are:

$$\begin{bmatrix} 1 & 0 & 0 & -l_1\sin\theta \\ 0 & 1 & 0 & 0 \\ 0 & 0 & 1 & -l_2-l_1\cos\theta \\ 0 & 0 & 0 & 1 \end{bmatrix} \begin{bmatrix} 1 & 0 & 0 & 0 \\ 0 & 1 & 0 & l_3\sin\phi \\ 0 & 0 & 1 & -l_3\cos\phi \\ 0 & 0 & 0 & 1 \end{bmatrix} =$$

$$\begin{bmatrix} 1 & 0 & 0 & -l_1\sin\theta \\ 0 & 1 & 0 & l_3\sin\phi \\ 0 & 0 & 1 & -l_3\cos\phi-l_2-l_1\cos\theta \\ 0 & 0 & 0 & 1 \end{bmatrix}$$

where $l_1$, is the length of the bars or links 3a-3d of the upper linkage 1, $l_2$ is the vertical distance between the upper and lower linkages 1 and 11, i.e. in this case the distance between the centres of second and third boxes 2b, 12a, and $l_3$ is the length of the bars or links 13a-13d or the lower linkage 11. The reference position of the fourth box 12b is therefore $\{-l_1 \sin\theta, l_3\cos\phi, -l_3\cos\phi-l_2-l_1\cos\theta\}$.

Figure 4:
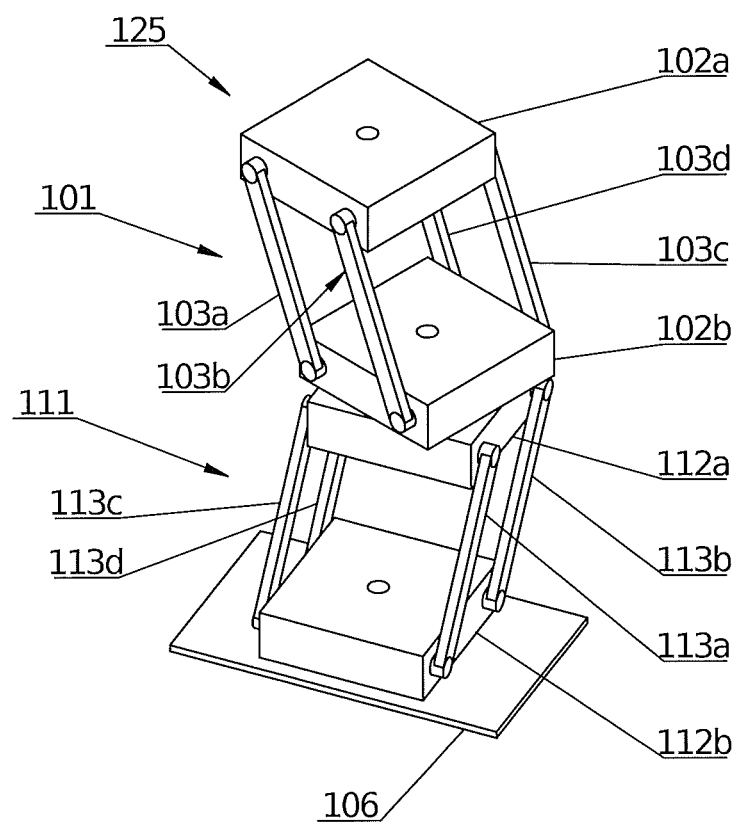
FIG. 4 shows an isometric view of a leg for a legged robot or walking machine.

FIG. 4 shows a similar leg 125 to that of FIGS. 1-3, except in this case including an additional degree of freedom—a twist at the knee between the second and third boxes 102b and 112a. As in the previous example, the leg 125 comprises upper linkages 101 and lower linkages 111, as well as a foot 106. The upper linkages 101 may include first and second boxes 102a, 102b and bars or links 103a-d. The lower linkages 111 may include the third and fourth boxes 112a, 112b and bars or links 113a-d.

Figure 7:
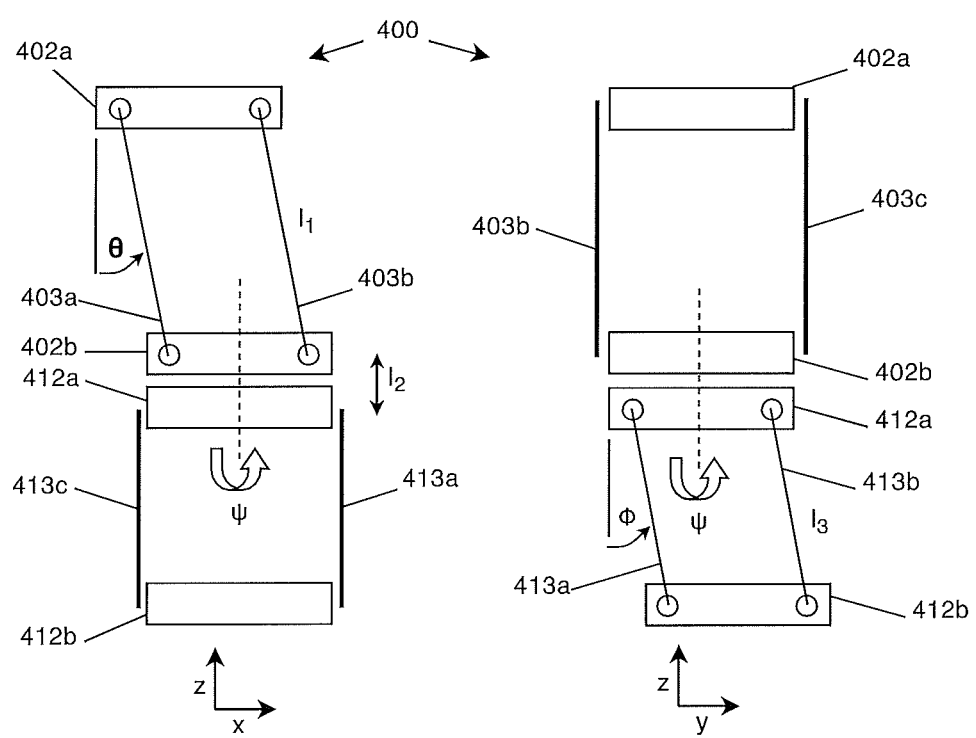
FIG. 7 illustrates the kinematics of the leg shown in FIG. 4, which are included in the robot of FIG. 6.

The arrangement of FIG. 4 can be best understood with reference to FIG. 7, which illustrates schematically the front and side views of such a leg arrangement, with rotation angles θ, ψ and ϕ. FIG. 7 shows leg 400 comprising a upper linkage 402a, 402b, 403a, 403b, 403c (fourth bar not shown) and a lower linkage 412a, 412b, 413a, 413b, 413c (fourth bar not shown). θ represents the rotation angle of at least part of the upper linkage relative to the z-axis (or longitudinal axis of the leg 400), ψ represents the twist angle between second and third boxes 402b, 412a, and ϕ represents the rotation angle of at least part of the lower linkage relative to the z-axis (or longitudinal axis of the leg 400).

The schematic in FIG. 7 also illustrates the parameter of the link lengths $l_1$, $l_2$, and $l_3$.

The forward kinematic chain for the leg of FIGS. 4 and 7 therefore comprises an upper linkage 101, at least part of the upper linkage 101 operating in the zx plane, a twist about the z axis, and lower linkage 111, at least part of the lower linkage 111 operating nominally in the zy plane:

$$\begin{bmatrix} 1 & 0 & 0 & -l_1\sin\theta \\ 0 & 1 & 0 & 0 \\ 0 & 0 & 1 & l_1\cos\theta \\ 0 & 0 & 0 & 1 \end{bmatrix} \begin{bmatrix} \cos\psi & -\sin\psi & 0 & 0 \\ \sin\psi & \cos\psi & 0 & 0 \\ 0 & 0 & 0 & -l_2 \\ 0 & 0 & 0 & 1 \end{bmatrix} \begin{bmatrix} 1 & 0 & 0 & 0 \\ 0 & 1 & 0 & l_2\sin\phi \\ 0 & 0 & 1 & -l_3\cos\phi \\ 0 & 0 & 0 & 1 \end{bmatrix} =$$

$$\begin{bmatrix} \cos\psi & -\sin\psi & 0 & -l_3\sin\theta\sin\psi-l_1\sin\theta \\ \sin\psi & \cos\psi & 0 & l_3\sin\phi\cos\psi \\ 0 & 0 & 1 & -l_3\cos\phi-l_2-l_1\cos\theta \\ 0 & 0 & 0 & 1 \end{bmatrix}$$

Figure 5:
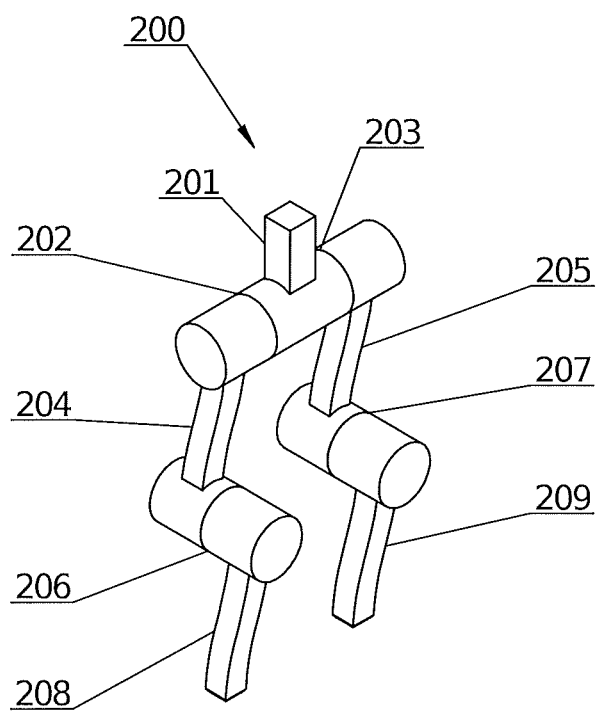
FIG. 5 shows the legs of a bipedal robot.

FIG. 5 shows an arrangement of the legs of an exemplary bipedal robot or walking machine 200. The robot 200 comprises a pelvis 201, which is connectable to an upper body (not shown). The robot 200 also comprises two legs, each leg including a respective hip joint 202, 203, upper link 204, 205, knee joint 206, 207, and lower leg link 208, 209.

Each leg therefore comprises one joint which nominally creates movement in the sagittal plane (hip joints 202 and 203), and one joint which nominally creates movement in the coronal plane (knee joints 206 and 207). The knee joints 206 and 207 operate orthogonally to the hip joints 202 and 203. In the example shown in FIG. 5, each hip joint 202, 203 is configured to provide motion of each respective upper link 204, 205 nominally in the sagittal plane, such as flexion or extension, of the bipedal robot 200 and each knee joint 206, 207 is configured to provide motion of each respective lower link nominally in the coronal plane, such as adduction or abduction, of the bipedal robot 200. It will be appreciated that in other examples the hip joint of each leg may be configured to provide motion of each respective upper link 204, 205 nominally in the coronal plane of the biped robot and each knee joint 206, 207 of each leg may be configured to provide motion of each respective lower link 208, 209 nominally on the sagittal plane of the biped robot.

Figure 6:
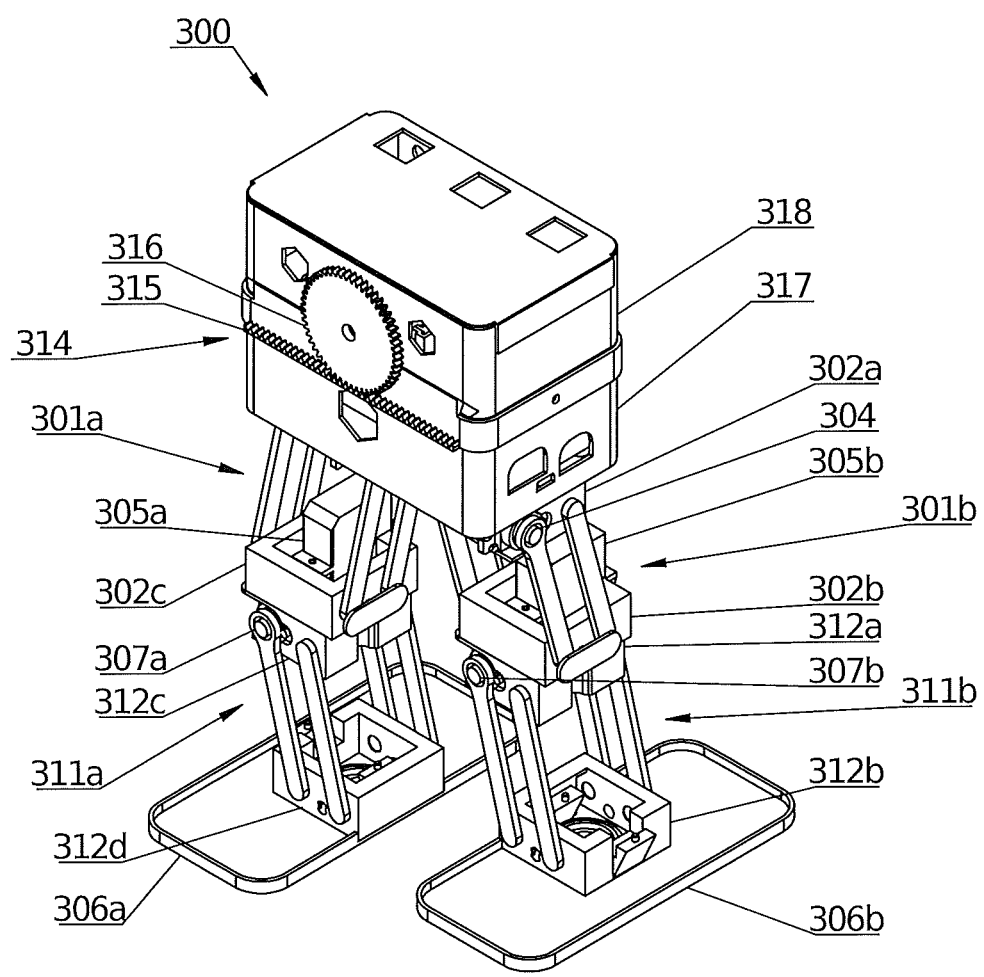
FIG. 6 shows a bipedal robot according to another described example.

FIG. 6 shows an exemplary bipedal robot 300 which includes two legs similar to those shown in FIGS. 4 and 7. Each leg comprises an upper linkage 301a, 301b, and a lower linkage 311a, 311b, as well as a foot 306a, 306b.

Each leg includes one or more motors or actuators. The actuators or motor are arranged in or on the leg, e.g. in a portion of the leg, such that the motors or actuators provide three or fewer actuated degrees of freedom of the leg. Each leg includes a first actuator or motor (not shown) for moving at least part of the upper linkages 301a, 301b of each respective leg. In this example, the first box of each leg, surround or encloses the first motor or actuator, which may be provided in the form of a hip joint motor. In use, the hip joint motor of each leg causes movement of at least part of the upper linkage 301a, 301b of each respective leg. Each leg can include a second actuator or motor, which may be provided in the form of a knee twist motor 305a, 305b. The knee twist motor is provided in the second box 302c, 302b of each leg and is operable to cause twisting movement between the second box 302b, 302b and the third box 312a, 312c. Each leg includes a third motor or actuator, which may be provided in the form of a knee joint motor 307a, 307b. The knee joint motor 307a, 307b of each leg is positioned or seated in the third box 312a, 312c. The knee joint motor 307a, 307b causes movement of at least part of the lower linkage 311a, 311b. In this example the first and third boxes 312a, 312c, 302a of each leg (only one of the first boxes is shown in FIG. 6) are of a first type. The second and fourth boxes 302b, 302c, 312b, 312d of each leg are of a second type.

Here, the fourth boxes 312b, 312c are rigidly connected to each foot 306b, 306a of the respective leg.

The exemplary robot 300 shown in FIG. 6 includes an upper body, including a lower portion, which may be provided in the form of lower body box 317, and an upper portion, which may be provided in the form of an upper body box 318. The robot 300 includes a prismatic joint 314, which may be formed by a rack 315 and pinion 316 arrangement. The pinion 316 is arranged on the upper body box 318 and cooperates with the rack 325, which in this example is provided by the lower body box 317. In use, rotation of the pinion 316 (for example caused by a motor or actuator) causes the upper body box 318 to be shifted relative to the lower body box 317 and/or the legs of the robot 300. The upper body box 317 may be moved relative to the lower body box 318 in a transverse plane of the robot 300, e.g. in the sagittal and/or coronal plane.

In this example, the upper body box 318 contains a battery and other components, and the prismatic joint 314 allows this weight to be shifted relative to the legs of the robot 300, for example to be over a supporting foot during a locomotive movement. It will be appreciated that in other examples other arrangements of the upper body may be used. For example, the upper body may include one or more arms, or additional revolute, rotational and/or prismatic joints, such as torso joints. Alternatively, the robot may not comprise an upper body, for example carrying batteries and other components in lower body 317, and may rely on using the legs to move the centre of mass of the robot. In this alternative example the robot may still comprise other joints and links, for example arms.

In this example, the hip joint and knee joint motors 304, 305a, 305b, 307a, 307b of each leg are provided in the form of standard RC micro servos and the knee twist motors 305a, 305b are of a different and less powerful type. Each of the first type of box 302a, 312a, 312c are designed/configured to form a friction fit with the respective standard micro RC servo Each of first type of boxes 302a, 312a, 312c includes connector points (or linkage connection points) for connection of the links or bars of the upper and lower linkages 301a, 301b, 311a, 311b. The second type of box 302b, 302c, 312b, 312d is also configured as a housing for respective micro servo 305a, 305b. In use, each micro servo 305a, 305b is arranged to be orthogonal to the standard micro servo arranged in a respective first type of box 302a, 312a, 312c. The second type of box 302b, 302c, 312b, 312d includes connector points (or linkage connection points) for connection of the links or bars of the upper and lower linkages 301a, 301b, 311a, 311b. The boxes 302a-c and 312a-d can be considered as examples of servo housings.

As can be seen from FIG. 6, the fourth box 312b, 312d of each leg does not include a motor or actuator but instead is rigidly connected to the respective foot 306a, 306b of each leg. It will be appreciated that in other examples, each fourth box may include a respective motor or actuator, which may be arranged to create ankle twist joints (e.g. to move the foot 306a, 306b in a coronal or sagittal plane of the robot 300). These ankle twist joints may be used instead of or in addition to the knee twist joints.

Figure 8:
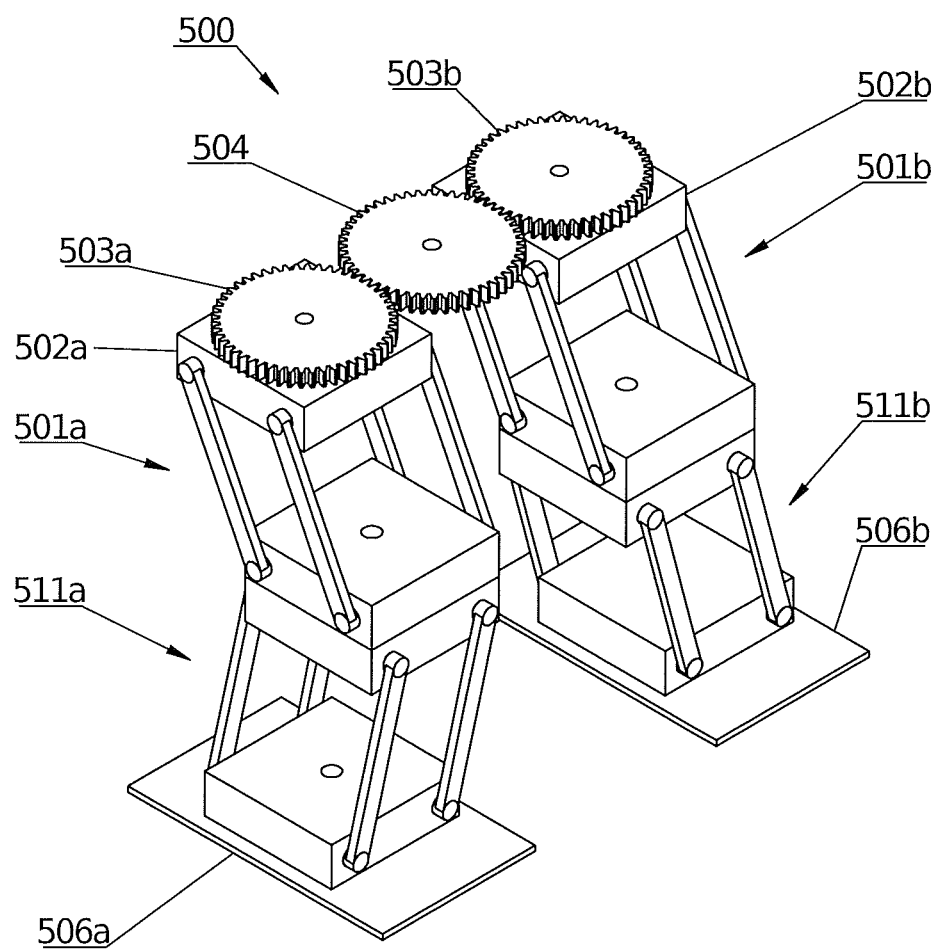
FIG. 8 shows a bipedal robot including two of the legs shown in FIGS. 1-3.

FIG. 8 shows an example of a pair of legs 500 for a legged robot or walking machine. The pair of legs 500 includes two of the legs shown in FIGS. 1-3. Each leg comprises an upper linkage 501a, 501b, lower linkage 511a, 511b, and a foot 506a, 506b. In this example, the pair of legs 500 includes a hip-twist joint/actuator. The hip-twist joint/actuator includes two spur gears 503a, 503b, which are attached to the respective first boxes 502a and 502b of legs 500. The two spur gears 503a, 503b cooperate with a central gear 504, which is arranged between the two spur gears 503a, 503b. In use, when the central gear 504 is rotated, e.g. by an actuator or motor, the spur gears 503a, 503b cause a rotation or twist movement of each leg above the hip joint. The central gear 504 meshes with gears 503a and 503b to create a linked rotation between the legs. A single actuator can be used to twist both legs simultaneously. In this way, a pair of legs capable of complex three-dimensional movements may be provided, which requires five actuators.

It will be appreciated that in other examples other linkages are possible, for example to create opposing rotation of the legs. For example, the hip joints (e.g. the first boxes) may be twisted or rotated independently of each other, by removing the linkage and using two actuators.

Figure 9:
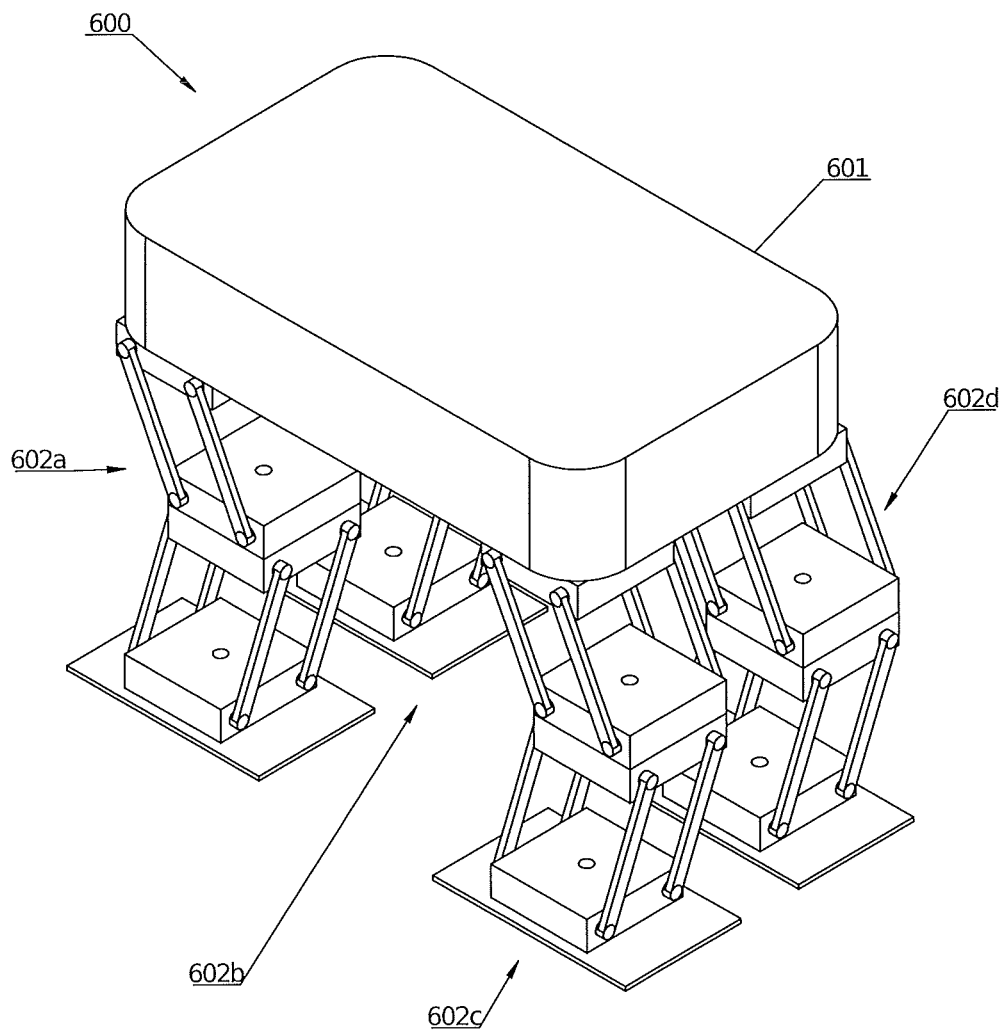
FIG. 9 shows a quadrupedal robot.

FIG. 9 shows an example of a quadruped 600 comprising four legs 602a-602d.

Each of the legs 602a-602d shown here are similar to the leg 25 shown in FIGS. 1 to 3, and described above. It will be understood that other legs may be used, for example those shown in FIG. 4 or FIG. 5. The quadruped 600 also comprises a body 601, to which the first box of each leg 602a-602d is attached.

Figure 10:
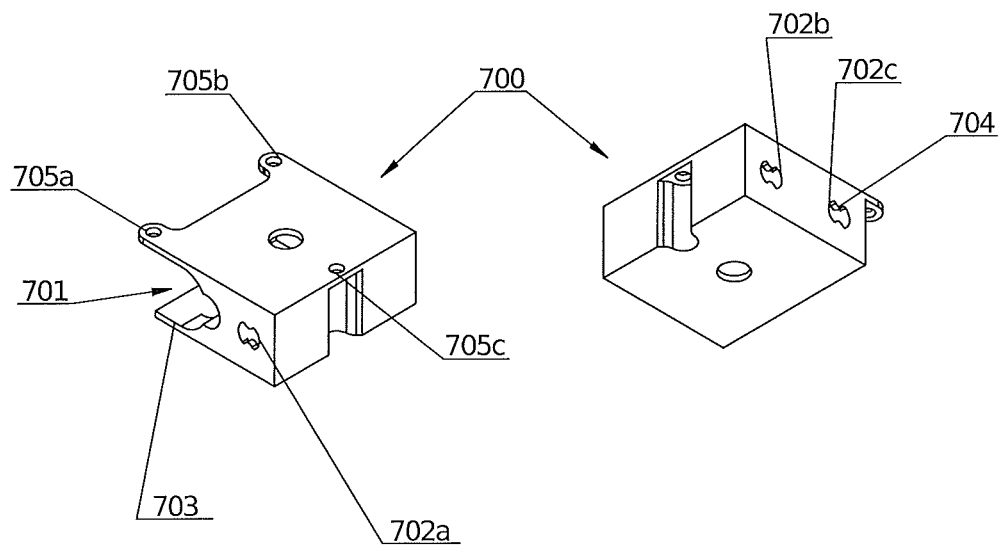
FIG. 10 shows two views of a servo housing.

FIG. 10 depicts two views of an exemplary servo housing 700.

Figure 11:
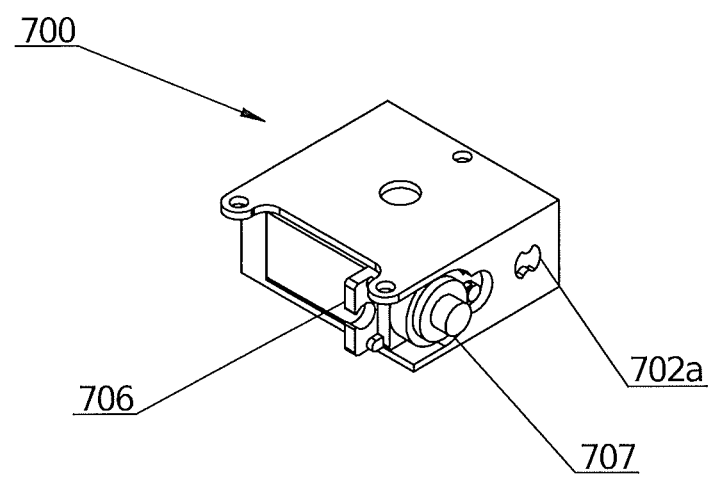
FIG. 11 shows the servo housing of FIG. 10 with a servo inserted.

The servo housing 700 comprises a recess 701 which is shaped to receive or accept a standard micro RC servo. When a servo is inserted, a linkage connection point 702c will be collinear with the output shaft of the servo, as shown in FIG. 11. In other words the linkage connection point and the output shaft of the servo each define a respective axis of rotation, which are arranged to be collinear or in line to each other, In this example, the servo housing 700 comprises three linkage connection points (or connector points) 702a-702c for connection of three respective bars or links of the upper or lower linkages. A fourth connection point can be provided by the output shaft of a servo, e.g. when the servo is positioned in the servo housing 700 shown in FIG. 11. Each of the three linkage connection points 702a-702c includes a cylindrical bore for receiving a shaft of a link or bar of the upper and/or lower linkages. Each of the three linkage connection points 702a-702c can include a respective lip, as indicated 704 for linkage connection point 702c. The lips 704 may be configured to retain a link or bar of the upper and/or lower linkages, once the link or bar has been inserted.

The servo housing 700 includes three fixing points 705a-705c, which may be used for fixing the legs (via the housing) to an external body, such as the pelvis or body of a robot.

FIG. 11 depicts the servo housing 700 of FIG. 11, with a standard servo 706 being positioned on the housing 700. The output shaft 707 of the servo 706 provides the fourth linkage connection point, and is collinear with the linkage connection point 702c shown in FIG. 10, as described above.

Figure 12:
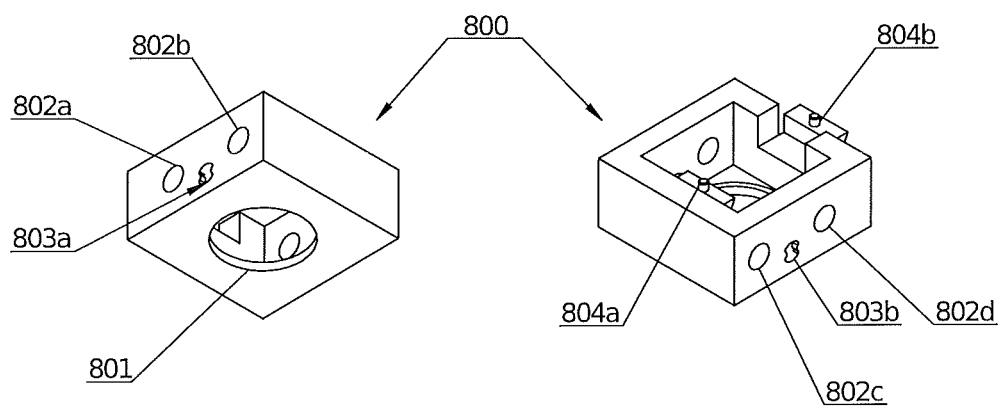
FIG. 12 shows two views of a servo housing according to another described example.

FIG. 12 shows an example of a servo housing 800. The servo housing 800 is configured to accept/arrange a standard micro RC servo motor such that the output shaft of the servo motor is concentric with central bore 801 of the housing. The housing 800 includes two shoulders having respective pins 804a, 804b. The shoulders are configured to receive and/or mount the servo motor to the housing 800.

Servo housing 800 comprises four linkage connection points 802a-802d, which in this example are provided in the form of four cylindrical bores, each bore being configured to receive a shaft of a link or bar of the upper and/or lower linkages. It will be appreciated that in other examples other types of linkage connection point arrangements may be used. Exemplary arrangements may include one or more shafts, bearings, bushings and/or other components suitable for allowing rotational motion.

Servo housing 800 includes two further bores 803a, 803b which are configured to receive a fixing part of a bar or link of the upper and/or lower linkages, e.g. to enable the securing of link or bar to the linkage connection points 802a-802d of the housing 800.

Figure 13:
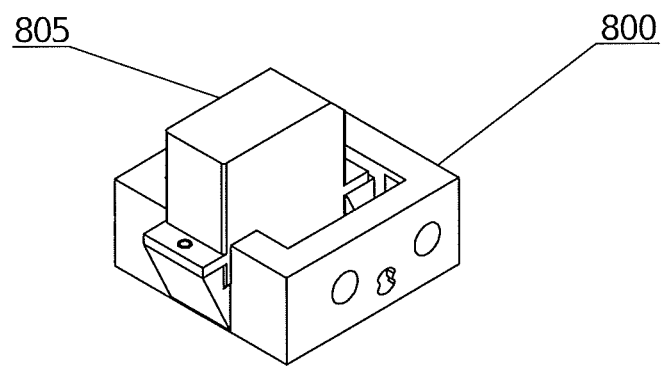
FIG. 13 shows the servo housing of FIG. 12 with a servo inserted.

FIG. 13 shows the servo housing 800 of FIG. 12, with a standard micro RC servo 805 inserted. The servo 805 is mounted on the shoulders having pins 804a, 804b, and the output shaft of the servo 805 is concentric with central bore 801.

It will be appreciated that in some examples, the housing may be part or comprised in the servo motor. The housing may then be considered as a casing of the servo motor.

Figure 14:
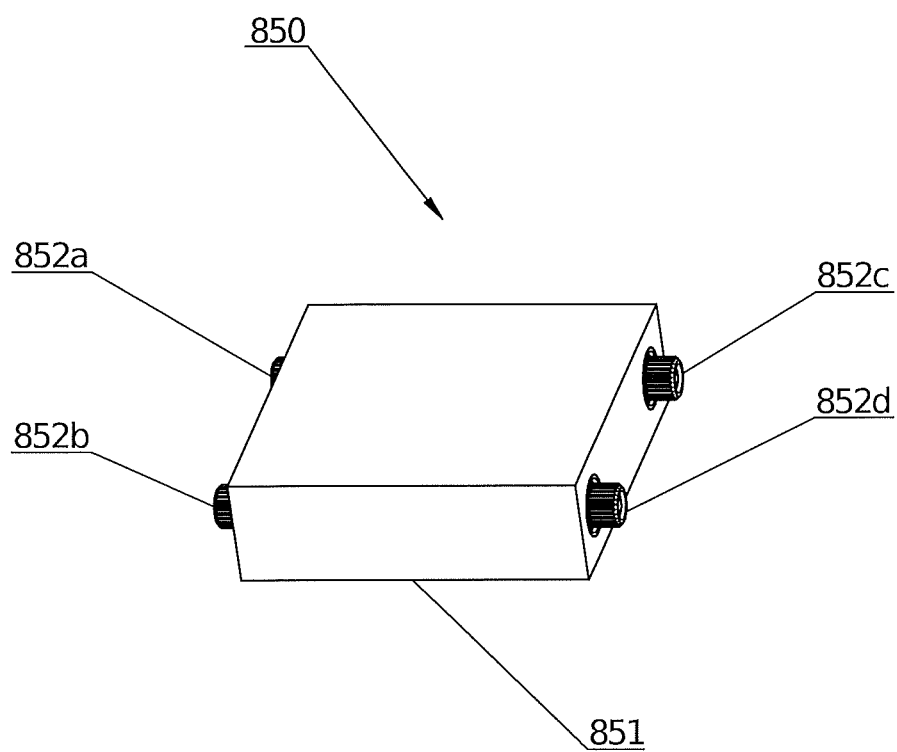
FIG. 14 shows a servo motor.

FIG. 14 is an example of servo motor 850. The servo motor 850 comprises an outer case 851, which supports four linkage connection points 852a-852d. In this example, the four linkage connection points 852a-852d comprise splined shafts supported by rotational bearings. One of the four connection points, 852a, is provided by the output shaft of the servo motor 850, which may be driven/operated by an internal motor, gearing and drive electronics to move to a commanded position. For example, the drive electronics may be configured to receive a signal requesting movement of the output shaft to a commanded position and/or to actuate the output shaft of the servo motor to rotate to the commanded position.

In this example, the four linkage connection points 852b-852d are provided as freely rotating shafts. In other examples, a first linkage connection point 852c, which is in a collinear arrangement with a second linkage connection point 852a may also be a driven servo output.

The four linkage points 852b-852d of the servo motor 850 may define a first pair of linkage connection points 852a, 852c and a second pair of linkage points 852b, 852d. Each pair shares a common rotational axis, and the common rotational axes of the first and second pair are non-collinear to each other. In other words, the common rotational axis of the first pair of linkage connection points is offset or spaced from the common rotational axis of the second pair. The common rotational axis of the first pair of linkage connection points may be substantially parallel to the common rotational axis of the second pair.

Figure 15:
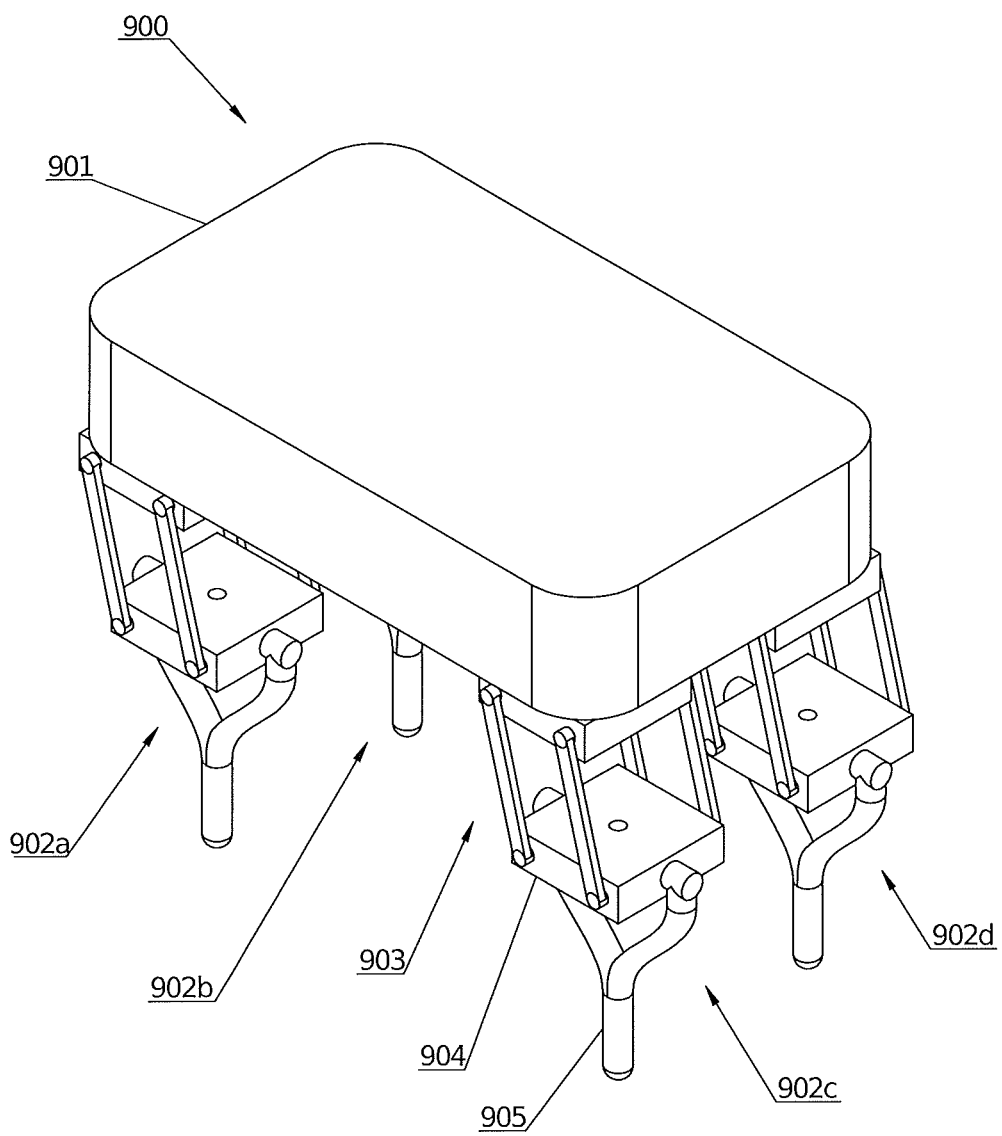
FIG. 15 shows a quadrupedal robot according to another described example.

FIG. 15 shows an exemplary quadrupedal robot 900. The quadrupedal robot 900 comprises four legs 902a-902d, each of which is similar to or the same as the legs shown in FIGS. 1 to 3 or FIG. 4. Each leg 902a-902d comprises an upper linkage (e.g. 903) which may be provided in the form of a four-bar linkage, and is configured to keep the knee joint (e.g. the second box 904) parallel to the hip joint. In this example, at least part of the upper linkage (e.g. 903) can be moved nominally in the sagittal plane.

The knee joint itself is a revolute joint, which is configured to move a lower link (e.g. 905) with respect to the knee joint (e.g. 904). The knee joint is configured to move in the coronal plane, i.e. about an axis orthogonal to at least one axis of the hip joint.

The robot 900 also comprises a body 901, to which each of the legs 902a-902d are fixed. Each lower link (e.g. 905) terminates in a point foot. These point feet may simplify the interaction of the robot with the ground or reducing the risk of a foot becoming caught or obstructed.

Figure 16:
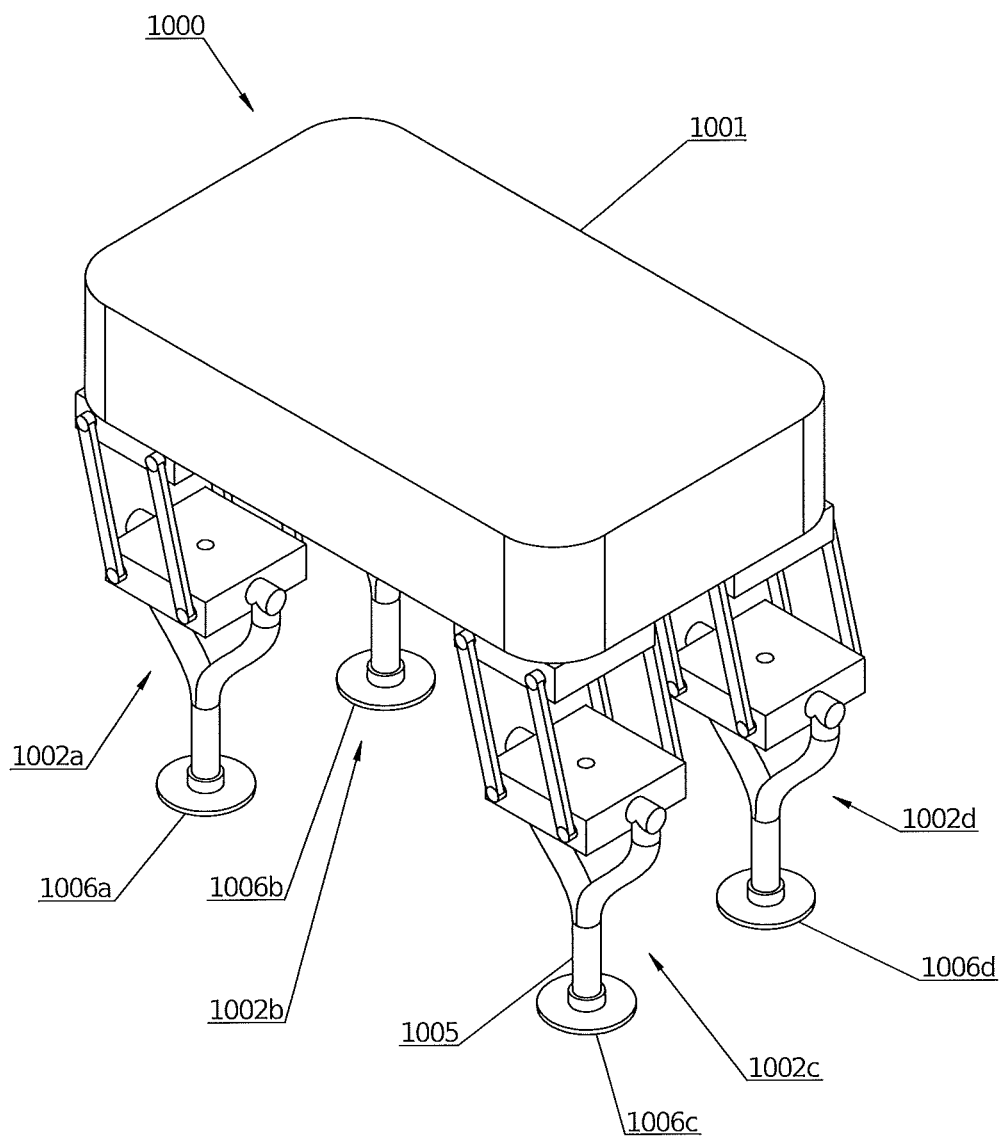
FIG. 16 shows a quadrupedal robot according to another described example.

FIG. 16 shows an exemplary quadrupedal robot 1000 similar to that of FIG. 15. However, each of the legs 1002a-1002d terminates in a shoe 1006a-1006d. As before, the robot 1000 comprises a body 1001 which is fixed to the hip joint (or part thereof) of each leg 1002a-1002d.

The lower link of each leg (e.g. 1005) is connected to a foot, which may be provided as shoe 1006a-1006d. In this example, the link between the lower link of each leg (e.g. 1005) and its respective shoe 1006a-1006d is provided by a spherical joint with elastic elements, which extend in a direction substantially parallel to the body 1001 and may nominally return each shoe 1006a-1006d to a position parallel to the body 1001.

This may result in the shoes 1006a-1006d providing a greater weight bearing area and being adaptable to the contours of the terrain the robot is moving over. This may be useful, for example if the robot is walking over rubble or granular terrain.

FIG. 17 summarises the step of an exemplary method for producing locomotion of a legged robot or walking machine. The method includes providing a legged robot or walking machine, for example the legged robot or walking machine shown in FIG. 5, 6, 9, 15 or 16 (1501).

The method includes actuating one or more motors of a first leg and a second leg of the legged robot or walking machine (1502). Actuation of the one or more motors of the first and second legs can result in movement of at least part of the upper and/or lower linkage of the first leg and/or in movement of at least part of the upper and/or lower linkage of the second leg. Movement of at least part of the upper and/or lower linkages of the first and second legs can result or cause walking of the legged robot or walking machine.

The method includes actuating the hip joint of the first leg, e.g. to move at least part of the upper linkage in a first direction (e.g. forward direction) in the sagittal plane (or coronal plane) of the legged robot or walking machine (1503) This may lift the first leg from a ground and/or lower the first leg to a ground.

The method includes actuating the hip joint of the second leg to move at least part of the upper linkage in a second direction (e.g. backward direction) in the sagittal plane (or coronal plane) of the legged robot or walking (1504), e.g. while moving the first leg. The second direction is opposed to the first direction.

Subsequent to lowering the first leg to the ground, the method includes actuating the hip joint of the second leg to move at least part of the upper linkage in the first direction in the sagittal plane (or coronal plane) of the legged robot or walking machine, e.g. to lift the second leg from the ground and/or lower the second leg to the ground.

Subsequent to lowering the first leg to a ground, the method includes actuating the hip joint of the first leg to move at least part of the upper linkage in the second direction in the sagittal plane (or coronal plane) of the legged robot or walking, e.g. while moving the second leg.

The method includes actuating the knee joint of the first and/or second legs to move at least part of the lower linkage of the first and/or second leg in the coronal plane (or sagittal plane) of the legged robot or walking machine, when the first and second legs are in contact with the ground (1505).

Once the first leg has been lowered to the ground, the step of actuating the knee joint of the first and/or second legs includes actuating the knee joint of the first and second legs to move the lower linkage of the first and second legs in the coronal plane (or sagittal plane) in a direction of the first leg. This may permit a weight or centre of mass of the legged robot or walking machine to be shifted from one the second leg to the first leg.

Once the second leg has been lowered to the ground, the step of actuating the knee joint of the first and/or second legs includes actuating the knee joint of the first and second legs to move at least part of the lower linkage of the first and second legs in the coronal plane (or sagittal plane) in a direction of the second leg. This may permit the weight or centre of mass of the legged robot or walking machine to be shifted from one the first leg to the second leg.

It will be appreciated that the upper and/or lower linkage may be or include upper four bar linkage, lower four bar linkage, upper pair of four-bar linkages and a lower pair of four-bar linkages, respectively.

It will be appreciated that at least part or all of the upper and/or lower linkages may move, in use.

It will be appreciated that the term linkage connection point encompasses a connector point and vice versa.

It should be understood that the embodiments described herein are merely exemplary and that various modifications may be made thereto without departing from the scope of the invention.

For example, it will be appreciated that in other examples the foot of the/each leg may be attached to at least one link of the lower linkage by a compliant joint, spherical or universal joint.

The invention claimed is:

1. A leg for a legged robot or walking machine, wherein the leg comprises:
  one or more fixing points for fixing the leg to an external body;
  an upper link and a lower link;
  a hip joint, the hip joint being configured to provide motion of the upper link relative to the one or more fixing points about one or more axes of the hip joint;
  a knee joint, the knee joint being configured to provide motion of the lower link relative to the upper link about one or more axes of the knee joint,
  wherein:
    the knee joint is configured to provide motion around the one or more axes of the knee joint orthogonal or substantially orthogonal to the one or more of the hip joint axes,
    the leg comprises three or fewer actuated degrees of freedom,
    the hip joint is configured to provide motion of the upper link nominally in a sagittal plane, and
    the knee joint is configured to provide motion of the lower link nominally in a coronal plane.

2. The leg according to claim 1, wherein:
  the hip joint is further configured to provide motion of the upper link nominally in the coronal plane, and
  the knee joint is further configured to provide motion of the lower link nominally in the sagittal plane.

3. The leg according to claim 1, wherein a position of a distal end of the lower link relative to the hip joint can be substantially described by $\{-l_1 \sin\theta, l_3 \cos\Phi, -l_3 \cos\Phi - l_2 - l_1 \cos\theta\}$, where $\theta$ and $\Phi$ are angles of two actuated degrees of freedom of the three or fewer actuated degrees of freedom, or by $\{-l_3 \sin\theta \cos\psi - l_1 \sin\theta, l_3 \sin\phi \cos\psi, -l_3 \cos\phi - l_2 - l_1 \cos\theta\}$, where $\theta$, $\psi$ and $\Phi$ are angles of three actuated degrees of freedom of the three or fewer actuated degrees of freedom, and where $l_1$ is a length of bars of the upper link, $l_2$ is a vertical distance between the upper link and the lower link, and $l_3$ is a length of bars of the lower link.

4. The leg according to claim 1, wherein the knee joint is configured to provide motion of at least one of the upper or lower links nominally in a transverse or horizontal plane of the leg and about a nominally longitudinal axis of the leg.

5. The leg according to claim 1, wherein the knee joint and/or hip joint are configured to provide motion of at least one of the upper link or the lower link nominally in a transverse or horizontal plane of the leg and about a nominally longitudinal axis of the leg.

6. The leg according to claim 1, wherein:
  the upper link is of or comprised in an upper linkage, and
  the upper linkage is configured or arranged to maintain the knee joint and the hip joint substantially parallel to each other during movement of the leg.

7. The leg according to claim 1, wherein:
  the lower link is part of or comprised in a lower linkage, and
  the lower linkage is configured to maintain at least one of the knee joint, a foot or an ankle substantially parallel to each other during movement of the leg.

8. The leg according to claim 1, wherein the leg comprises an ankle, the ankle is connected to a distal end of the lower link, the upper link is part of or comprised in an upper linkage and the lower link is part of or comprised in a lower linkage, the upper and lower linkages being configured or arranged to maintain the hip joint and ankle and/or a foot substantially parallel to each other during movement of the leg.

9. A legged robot or walking machine comprising one or more legs according to claim 1.

10. The robot according to claim 9, wherein the legged robot or walking machine is a biped, comprising two legs including the leg.

11. The robot according to claim 9, wherein the legged robot or walking machine is a quadruped, comprising four legs including the leg.

12. The robot according to claim 9, wherein the legged robot or walking machine comprises a linked hip-twist actuator, which is configured to provide a twist motion or a motion in a transverse plane of the legged robot or walking machine to the hip joints of two or more legs including the leg.

13. The robot according to claim 9, wherein:
  the legged robot or walking machine comprises an upper body, which comprises one or more torso joints, and one or more of the torso joints is a prismatic joint.

14. The robot according to claim 13, wherein the upper body comprises an upper portion and a lower portion, the prismatic joint being configured to provide motion of the upper portion relative to the lower portion and/or legs along a nominally horizontal or transverse axis of the legged robot or walking machine in the sagittal and/or coronal planes.

15. A leg for a legged robot or walking machine, wherein the leg comprises:
  one or more fixing points for fixing the leg to an external body;
  an upper link and a lower link;
  a hip joint, the hip joint being configured to provide motion of the upper link relative to the one or more fixing points about one or more axes of the hip joint;
  a knee joint, the knee joint being configured to provide motion of the lower link relative to the upper link about one or more axes of the knee joint,
  wherein:
    the knee joint is configured to provide motion around the one or more axes of the knee joint orthogonal or substantially orthogonal to the one or more of the hip joint axes,
    the leg comprises three or fewer actuated degrees of freedom, and
    wherein a position of a distal end of the lower link relative to the hip joint can be substantially described by $\{-l_1 \sin\theta, l_3 \cos\Phi, -l_3 \cos\Phi - l_2 - l_1 \cos\theta\}$, where $\theta$ and $\Phi$ are angles of two actuated degrees of freedom of the three or fewer actuated degrees of freedom, or by $\{-l_3 \sin\theta \cos\psi - l_1 \sin\theta, l_3 \sin\phi \cos\psi, -l_3 \cos\phi - l_2 - l_1 \cos\theta\}$, where $\theta$, $\psi$ and $\Phi$ are angles of three actuated degrees of freedom of the three or fewer actuated degrees of freedom, and where $l_1$ is a length of bars of the upper link, $l_2$ is a vertical distance between the upper link and the lower link, and $l_3$ is a length of bars of the lower link.

16. A leg for a legged robot or walking machine, wherein the leg comprises:

one or more fixing points for fixing the leg to an external body;

an upper link and a lower link;

a hip joint, the hip joint being configured to provide motion of the upper link relative to the one or more fixing points about one or more axes of the hip joint;

a knee joint, the knee joint being configured to provide motion of the lower link relative to the upper link about one or more axes of the knee joint, wherein:

the knee joint is configured to provide motion around the one or more axes of the knee joint orthogonal or substantially orthogonal to the one or more of the hip joint axes, the leg comprises three or fewer actuated degrees of freedom, and the knee joint is configured to provide motion of at least one of the upper or lower links nominally in a transverse or horizontal plane of the leg and about a nominally longitudinal axis of the leg.

17. A leg for a legged robot or walking machine, wherein the leg comprises:

one or more fixing points for fixing the leg to an external body;

an upper link and a lower link;

a hip joint, the hip joint being configured to provide motion of the upper link relative to the one or more fixing points about one or more axes of the hip joint;

a knee joint, the knee joint being configured to provide motion of the lower link relative to the upper link about one or more axes of the knee joint, wherein:

the knee joint is configured to provide motion around the one or more axes of the knee joint orthogonal or substantially orthogonal to the one or more of the hip joint axes, the leg consists of three or fewer actuated degrees of freedom, the hip joint is configured to provide motion of the upper link nominally in a sagittal plane, and the knee joint is configured to provide motion of the lower link nominally in a coronal plane.

* * * * *